United States Patent [19]
McGrail et al.

[11] Patent Number: 5,952,453
[45] Date of Patent: Sep. 14, 1999

[54] CURABLE COMPOSITIONS

[75] Inventors: Patrick T. McGrail; Paul Eustace; William S. Dewar, all of Cleveland, United Kingdom

[73] Assignee: Cytec Technology Corp., Wilimington, Del.

[21] Appl. No.: 08/537,880

[22] PCT Filed: May 18, 1994

[86] PCT No.: PCT/GB94/01057

§ 371 Date: May 8, 1996

§ 102(e) Date: May 8, 1996

[87] PCT Pub. No.: WO94/28051

PCT Pub. Date: Dec. 8, 1994

[30]     Foreign Application Priority Data

May 20, 1993 [GB]  United Kingdom ............... 9310400

[51] Int. Cl.⁶ ............... C08G 73/12; C08J 5/04; B32B 00/00
[52] U.S. Cl. ............ 528/310; 528/170; 528/172; 528/173; 528/174; 528/176; 528/185; 528/188; 528/220; 528/229; 528/322; 528/342; 528/350; 528/352; 528/353; 524/600; 524/606; 524/879; 428/411.1

[58] Field of Search ................... 528/350, 353, 528/342, 170, 172, 173, 174, 176, 188, 185, 220, 229, 322, 352, 310; 524/600, 606, 879; 428/411.1

[56]             References Cited

U.S. PATENT DOCUMENTS

| | | | |
|---|---|---|---|
| 4,455,418 | 6/1984 | Lauver | 528/322 |
| 4,514,447 | 4/1985 | Lauver | 528/342 |
| 5,091,505 | 2/1992 | Serafini et al. | 528/353 |
| 5,149,772 | 9/1992 | Serafini et al. | 528/353 |

FOREIGN PATENT DOCUMENTS 0439915  8/1991  European Pat. Off. .

OTHER PUBLICATIONS

British Polymer Journal, vol. 20, No. 1, (1988) "PMR–15 Processing, Properties and Problem—A Review", Douglas Wilson, pp. 405–416.

*Primary Examiner*—P. Hampton-Hightower
*Attorney, Agent, or Firm*—Gray Cary Ware & Freidenrich

[57]           ABSTRACT

Methylenedianiline-free, PMR-type, curable compositions based on m-phenylenediamine or mixtures of m-phenylenediamine and p-phenylenediamine are described.

29 Claims, 2 Drawing Sheets

CURABLE COMPOSITIONS

This invention relates to curable compositions.

High continuous use temperature ("CUT") composite materials of cross-linked polyimide matrices reinforced with fibres, especially continuous fibres, are known. Such composite materials have been used for many applications, especially in the aerospace industry in which strength-to-weight ratios and high CUT are particularly important, eg in jet engine components.

A particularly useful polyimide matrix material for use in such composites has been developed by NASA. This family of polyimide materials is known by the designation PMR (ie polymerisable monomer reactants). The PMR materials are the subject of inter alia U.S. Pat. Nos. 3,528,950, 3,745,149 and 7,603,055 and have been widely reviewed in the literature, for example T T Serafini and P Devigs, Applied Polymer Symposium No 22, 89–100, 1973; Ruth H Pater, SAMPE Journal, November/December 1981; T T Serafini, Proceedings of 5th International Conference on Composite Materials, 1007–1023, Metal Soc 1985, AIME; D Wilson, British Polymer Journal, 20(5), 405–416, 1988; and D A Scola and J H Vontell, Chemtech 112–121, February 1989.

The PMR curable compositions initially comprise an aromatic diamine, an end cap monomer and an aromatic tetracarboxylic acid, its dianhydride or alkyl diester. In accordance with U.S. Pat. No. 3,745,149, a useful combination of reactants is:

wherein R' is a tetravalent aryl radical and $R^2$ is alkyl or hydrogen and at least two $R^2$ are alkyl;

b) $H_2N-R^3-NH_2$ wherein $R^3$ is a divalent aryl radical; and c) compounds of formula:

wherein $R^2$ is as defined in a) and at least one $R^2$ is alkyl and $R^4$ is a divalent radical of the formula:

wherein $R^5$ is hydrogen or lower alkyl;
the molar ratio of a:b:c being n:(n+1):2, wherein n has a value from 1 to 20.

A commercially-available PMR resin, derived from the monomers dimethyl ester of 3,3',4,4'-benzophenonetetracarboxylic acid (BTDE)/4,4'-methylenedianiline (MDA)/methyl ester of 5-norbornene-2,3-dicarboxylic acid (NE) has a CUT of up to 316° C. in atmospheric air and is known by the designation PMR-15. The "15" in the designation is derived from the formulated molecular weight (FMW) of the composition. The FMW, as described in the 1985 Serafini paper, is considered to be the average molecular weight of imidized prepolymer that could have been formed if an amide-acid prepolymer had been synthesised and it is derived from the formula:

$$FMW = nMW_{BTDE} + (n+1)MW_{MDA} + 2MW_{NE} - 2(n+1)[MW_{(water)} + MW_{(methanol)}]$$

wherein MW stands for molecular weight. It is now common practise to denote the stoichiormetry of a PMR curable composition by dividing the FMW by 100.

A primary drawback of PRM-15, as reported in section 9.4 of the 1988 Wilson paper, is the suspected carcinogenic character of MDA. Although said section 9.4 indicates MDA has been substituted by other, less toxic, diamines (eg 4,4'-oxydianiline and 1,1-bis(4-aminophenyl)-1-phenyl-2,2,2-trifluoroethane as reported by W B Alston, Proc. Conf. High Temperature Polymer Matrix Composites, NASA Lewis Research Centre, 187–205, March 1983, the combination of properties provided by MDA could not be matched.

Other variants are disclosed in the references, for example PMR-II derived from the monomers dimethyl ester of 4,4'-(hexa-fluoroisopropylidene)bis(phthalic acid) (HFDE)/para-phenylene-diamine (p-PDA)/NE, and substitution of NE with aminostyrene, optionally with the addition of N-phenylnorbornene to improve processability, ie melt flow.

The reduced processibility of the curable composition resulting from substitution of MDA by p-PDA in PMR-II, thus enabling the enhanced thermal stability of p-PDA compared with MDA to be exploited, is offset by the increase in processibility afforded by the use of HFDE However, a primary drawback of PMR-II is the cost of HFDE.

It is an object of the invention to provide useful PMR curable compositions in which MDA is absent.

The object of the invention is achieved by the provision of a PMR curable composition in which the aromatic diamine comprises m-phenylenediamine or a mixture of p-phenylenediamine and m-phenylenediamine.

In particular, in accordance with the invention, a curable composition comprises:

a) at least one aromatic tetracarboxylic acid, its dianhydride or alkyl diester;

b) a diamine selected from the group consisting of p-phenylenediamine and m-phenylenediamine wherein the diamine is selected such that the molar ratio of p-phenylenediamine to m-phenylenediamine is in the range 0:100 to 95:5; and c) compounds of formula:

wherein $R^2$ are alkyl or hydrogen and at least one $R^2$ is alkyl and $R^4$ is a divalent radical of the formula:

wherein $R^5$ is hydrogen or lower alkyl; and, optionally, d) a viscosity modifier;

wherein the molar ratio of a:b:c is n:(n+1):2, wherein n has a value from 1 to 20, more particularly from 1 to 10, especially from 1.5 to 6.5 and wherein, optionally, at least some of c) is replaced by:

e) a component selected from the group consisting of a mono aromatic amine, acid, ester or anhydride having vinyl or ethynyl functionality;

wherein, when said component e) is present and is an amine, the molar ratio of a:b is adjusted to provide sufficient component a) to react with component e).

Preferably, component a) of the curable composition is at least one aromatic tetracarboxylic acid, its dianhydride or alkyl diester selected from the group consisting of 3,3',4,4'-benzophenonetetracarboxylic acid, 4,4'-(hexafluoroisopropylidene)bis-(phthalic acid) and 2,2',3,3'-diphenyltetracarboxylic acid, their dianhydrides or alkyl, preferably methyl, diesters; and especially is the dialkyl ester of the corresponding tetracarboxylic acid.

Preferably, component c) of the curable composition is a mono alkyl, preferably methyl, ester of 5-norbornene-2,3-dicarboxylic acid.

One preferred curable composition according to the invention comprises:

a) at least one $C_1$ to $C_4$ alkyl, preferably methyl, diester of an aromatic tetracarboxylic acid selected from the group consisting of 3,3',4,4'-benzophenonetetracarboxylic acid and 4,4'-(hexafluoroisopropylidene)bis(phthalicacid) and, optionally, a minor proportion of 2,2',3,3'-diphenyltetracarboxylic acid;

b) a diamine selected from the group consisting of p-phenylenediamine and m-phenylenediamine wherein the diamine is selected such that the molar ratio of p-phenylenediamine to m-phenylenediamine is in the range 0:100 to 95:5, preferably 5:95 to 60:40, more preferably 10:90 to 55:45, especially substantially 20:80; and c) a mono alkyl, preferably methyl, ester of 5-norbornene-2,3-dicarboxylic acid; and, optionally, d) a viscosity modifier;

wherein the molar ratio of a:b:c is n:(n+1):2, wherein n has a value from 1 to 20, more particularly from 1 to 10, especially from 1.5 to 6.5 and wherein, optionally, at least some of c) is replaced by:

e) a mono aromatic amine having vinyl or ethynyl functionality;

wherein, when component e) is present, the molar ratio of a:b is adjusted to provide sufficient component a) to react with component e).

Another preferred curable composition according to the invention comprises:

a) at least 10 mole % of a $C_1$ to $C_4$ alkyl, preferably methyl, diester of 4,4'-(hexafluoroisopropylidene)bis(phthalic acid) and, optionally, at least one $C_1$ to $C_4$ alkyl, preferably methyl, diester of an aromatic tetracarboxylic acid selected from the group consisting of 3,3',4,4'-benzophenonetetracarboxylic acid and 2,2',3,3'-diphenyltetracarboxylic acid;

b) a mixture of p-phenylenediamine and m-phenylenediamine in the molar ratios 95:5 to 70:30, preferably 90:10 to 75:25, more particularly 85:15 to 75:25, especially substantially 80:20; and c) a mono alkyl, preferably methyl, ester of 5-norbornene-2,3-dicarboxylic acid; and, optionally, d) a viscosity modifier;

wherein the molar ratio of a:b:c is n:(n+1):2, wherein n has a value from 1 to 20, more particularly from 1 to 10, especially from 1.5 to 6.5 and wherein, optionally, at least some of c) is replaced by:

e) a mono aromatic amine having vinyl or ethynyl functionality;

wherein, when component e) is present, the molar ratio of a:b is adjusted to provide sufficient component a) to react with component e).

Preferably, component d) of the curable composition is selected from the group consisting of mono- or bis-nadimides derived respectively from mono, unsubstituted or halo-substituted, amines and unsubstituted diamines of formula $H_2N$—Ph—$(X$—Ph$)_2$—$NH_2$ wherein Ph is 1,3-phenylene or 1,4-phenylene, X is a direct bond, —CO—, —SO—, $SO_2$—, —O—, —$CR^6_2$ wherein $R^6$ is —H, —$CH_3$ or —$CF_3$ and a is an integer from 0 to 5, preferably from 0 to 2 and especially is 0 or 1.

More particularly, component d) of the curable composition is at least one compound of formula:

wherein $R^7$ is selected from the group consisting of bis (phenyl)methane and 1,3-phenylene and $R^6$ is selected from the group consisting of phenyl and 4-fluorophenyl. Preferably, component d) is present in the curable composition in an amount not more than 10%, preferably not more than 5%, especially substantially 2%, by weight based on the weight of components a), b) and c). Preferably, component d) is present in the curable composition in an amount of at least 1% by weight of components a), b) and c).

Preferably, component e) of the curable composition is selected from the group consisting of 3-aminostyrene, 4-aminostyrene, 3-ethynylaniline, 4-ethynylaniline and 3- or 4-allyl-substituted or ethynyl-substituted phthalic monoalkyl, preferably methyl, ester or anhydride. More preferably, component e) is 4-aminostyrene.

Preferred curable compositions according to the invention have a FMW between 1200 and 6000, more preferably between 1200 and 3500.

Preferably, the curable composition according to the invention further comprises fibre reinforcement. Although the fibres may be any suitable fibres such as glass, carbon or organic polymers, preferably, the fibres are carbon fibres, especially graphite fibres. Graphite fibres which have been found to be especially useful in the invention are those supplied by Amoco under the trade designations T650-35 and T650-42; those supplied by BASF under the trade designation Celion G35-500; those supplied by Toray under the trade designation T800-HB; and those supplied by Hercules under the trade designation IM 8. The fibres may be short or chopped fibres, typically of mean fibre-length not more than 20 mm, for example about 6 mm. Alternatively, and preferably, the fibres are continuous and may, for example, be unidirectionally-disposed fibres or a woven fabric. Combinations of both short and/or chopped fibres and continuous fibres may be utilised. The fibres may be sized or unsized.

The curable composition according to the invention may also contain other fillers such as toughening agents such as thermoplastics optionally having reactive groups; aggregates such as glass beads; polytetrafluoroethylene; graphite; boron nitride; mica; talc; vermiculite; nucleating agents; and stabilisers. The total of such materials and the fibre reinforcement should be such that the curable composition contains at least 20% by volume of reinforcing fibres and/or fillers. The percentages of fibres and such other materials are calculated on the total composition after curing.

The invention also includes composite materials comprising plies of fibre-reinforced curable compositions according to the invention laminated together by heat and pressure, for example by autoclave, compression moulding or by heated rollers, at a temperature above the curing temperature of the curable composition.

When the fibres of the reinforcement are continuous and unidirectional, the resulting multi-ply laminate may be anisotropic in which the fibres are oriented essentially parallel to one another or quasi-isotropic in each ply of which the fibres are oriented at an angle, conveniently 45° as in most quasi-isotropic laminates but possibly for example 30° or 60° or 90° or intermediately, to those in the plies above and below. Orientations which are between anisotropic and quasi-isotropic, and combination laminates, may be used. Suitable laminates contain at least four, preferably at least eight, plies. The number of plies is dependent on the application for the laminate, for example the strength required, and laminates containing thirty-two or even more, for example several hundred, plies may be desirable. There may be aggregates, as mentioned above, in interlaminar regions.

When the fibres of the reinforcement are in the form of a woven fabric, structures may be quasi-isotropic or between anisotropic and quasi-isotropic.

BRIEF DESCRIPTION OF THE DRAWINGS

The invention will now be illustrated by reference to the following Examples and to the accompanying drawings, in which.

In the Examples, the following components, methods and tests were used:

Esters dimethyl ester of 3,3',4,4'-benzophenonetetracarboxylic acid—BTDE
dimethyl ester of 4,4'-(hexafluoroisopropylidene)bis (phthalic acid)—HFDE
dimethyl ester of 2,2',3,3'-diphenyltetracarboxylic acid—BPDE
dimethyl ester of 3,3',4,4'-diphenylethertetracarboxylic acid—ODPE
dimethyl ester of 3,3',4,4'-diphenylsulphonetetracarboxylic acid—DSDE
diethyl ester of pyromellitic acid—PMDE Diamines 4,4'-methylenedianiline—MDA
p-phenylenediamine—p-PDA
m-phenylenediamine—m-PDA

End Caps mono methyl ester of 5-norbornene-2,3-dicarboxylic acid—NE
p-aminostyrene—PAS The esters were prepared by refluxing the corresponding dianhydride or anhydride as the case may be with the appropriate alcohol for 2 hours.

Viscosity Modifiers

N-phenylnadimide—NPN
4-fluoro-N-phenylnadimide—F-NPN
4,4'-methylenedianilinebisnadimide, ie -MDA-bisnadimide m-phenylenediaminebisnadimide, ie -m-PDA-bisnadimide The viscosity modifiers were readily prepared by converting the appropriate amine with nadic anhydride by stirring in acetone at room temperature followed by cyclodehydration of the resultant amic acid to the required imide using sodium acetate and acetic anhydride in refluxing acetone.

These preparations are readily exemplified with reference to the preparation of NPN which was prepared as follows. A solution of 5-norbornene-2,3-dicarboxylic anhydride (196.99 g, 1.20 mole) in 400 ml of acetone was formed by gently heating the ingredients in a reaction flask. Aniline (109.35 ml, 1.20 mole) was then added to the flask dropwise, the temperature of the reaction mixture being maintained at ambient by means of an ice/water bath. The reaction mixture was then stirred at ambient temperature for a further 2 hours. A precipitated white product (N-phenylnadic acid) was filtered off and washed on the filter with a minimum quantity of acetone. The washed and filtered product was dried in a vacuum oven at 60° C. (yield=81%).

The N-phenylnadic acid (249.59 g, 0.47 mole) was slurried with 400 ml of acetone in a reaction flask. Sodium acetate (32.82 g, 0.40 mole) and acetic anhydride (136 ml, 1.44 mole) were then added to the flask. The temperature of the reaction mixture was then increased until a gentle reflux of the acetone was achieved. The temperature of the reaction mixture was maintained at reflux for a further 3 hours and was then cooled to ambient temperature and slowly added to a vigorously-stirred ice/water mixture. The resultant precipitated white product (NPN) was then filtered off, washed several times with warm distilled water and dried at 60° C. in a vacuum oven (yield=65%).

Thermal Oxidative Stability

A number of the Examples are concerned with the thermal oxidative stability (TOS) of samples under isothermal aging conditions. The TOS of the samples was assessed by locating a sample in an aluminium cup and periodically measuring weight loss during isothermal ageing of the sample at the ageing temperature, eg 350° C., in an air circulating oven at ambient pressure. The isothermal ageing was taken over approximately 500 hours.

Glass Transition Temperature (Tg)

The Tg of samples was determined using dynamic mechanical thermal analysis (DMTA) (E' onset) under nitrogen and at a heating rate of 2° C./min. The DMTA was done using a single cantilever method wherein the sample is clamped at one end and is oscillated at a frequency of 10 Hz.

Neat Resin Examples

Curable compositions of alkyl diester/diamine/end cap in the molar ratios n:n+1:2 were converted into PMR prepolymer moulding powders using the following method which is exemplified by a PMR-15 composition:

BTDE (4.03 g), MDA (3.06 g) and NE (1.96 g) were dissolved in methanol (30 ml). The resultant solution was placed on a hot block (120° C.) to evaporate the methanol. When the majority of the methanol had evaporated off, the residue was placed in an air circulating oven (120° C.) until the remaining methanol had evaporated and partial imidisation was initiated. The resultant solid material was crushed into a fine powder, the oven temperature was increased to 200° C. and held for 1 hour to complete imidisation. The imidised material was then ground into a fine powder suitable for moulding.

When part or all of the end cap is an amine, eg PAS, the molar ratio of alkyl diester and diamine is adjusted so that there is sufficient alkyl diester present to react with the amine. When all of the end cap is amine, the molar ratios of alkyl diester/diamine/end cap are n+1:n:2.

Processability

Samples of the imidised moulding powders were assessed for processability by using rheometrics to determine the complex viscosity $\eta^*$. Typical conditions used to evaluate the powder samples, which were compressed into 25 mm diameter discs prior to rheological evaluation, using a RMS 800 rheometer manufactured by Rheometrics Limited were:

| | |
|---|---|
| Initial Temperature | 200° C.–300° C. |
| Final Temperature | 350° C. |
| Heating Rate | 2.0° C./min |
| Strain Rate | 1.0% |
| Oscillation | 10 rads/sec |
| Data Points | One every 10 sec |

NB The actual temperature range scanned varied depending upon the moulding powder melt temperature and cure temperature.

Two moulding cycles were used depending on whether the end caps of the imidised material were derived from NE (nadic ends) or PAS (styrene ends). The methods are given below:

Nadic-ended Prepolymers

Imidised moulding powder (2.5 g) was poured into the female section of a matched metal mould (40 mm×10 mm)

and the male section was inserted. The mould was placed in an air circulating oven (280° C.–300° C.) and left for 5–10 minutes. The preheated mould was then placed between the platens of a press (preheated to 320° C.). After 15 minutes, pressure was applied and gradually increased up to a maximum of 6.1 MPa (depending upon the formulation). The temperature and pressure were held constant for 1–2 hours to complete curing. The mould was then cooled under pressure to below 150° C. and removed from the press. The resultant neat resin plaque was removed from the mould.

The plaque was post cured at an appropriate temperature in an air circulating oven for 24 hours at ambient pressure.

Styrene-ended Prepolymers

Imidised moulding powder (2.5 g) was poured into the female section of a matched metal mould (40 mm×10 mm) and the male section was inserted. The cold mould was placed between the platens of a press (preheated to 302° C.), held for 15 minutes and then a pressure of 0.6 MPa was applied. The pressure was held for 30 minutes following which the press temperature was increased to 350° C. The temperature was held constant for 1 hour during which period the pressure was increased to 2.5 MPa. The temperature was then increased to 371° C. and held for a further 1 hour with the pressure maintained at 2.5 MPa. The mould was then cooled under pressure to below 150° C. and removed from the press. The resultant neat resin plaque was removed from the mould.

The plaque was post cured at an appropriate temperature in an air circulating oven for 24 hours at ambient pressure. In fibre-reinforced samples:

$G_{1c}$ was determined in accordance with the Protocols for Interlaminar Fracture Testing of Composites, ESIS Protocol, Co-ordinator P Davies, FREMER, Plouzane, France, May 1992—specimen dimensions 25×145×3 mm; and SBSS was determined using ASTM D2344-84—specimen dimensions 25×10×3 mm.

EXAMPLE 1

Figure 1:
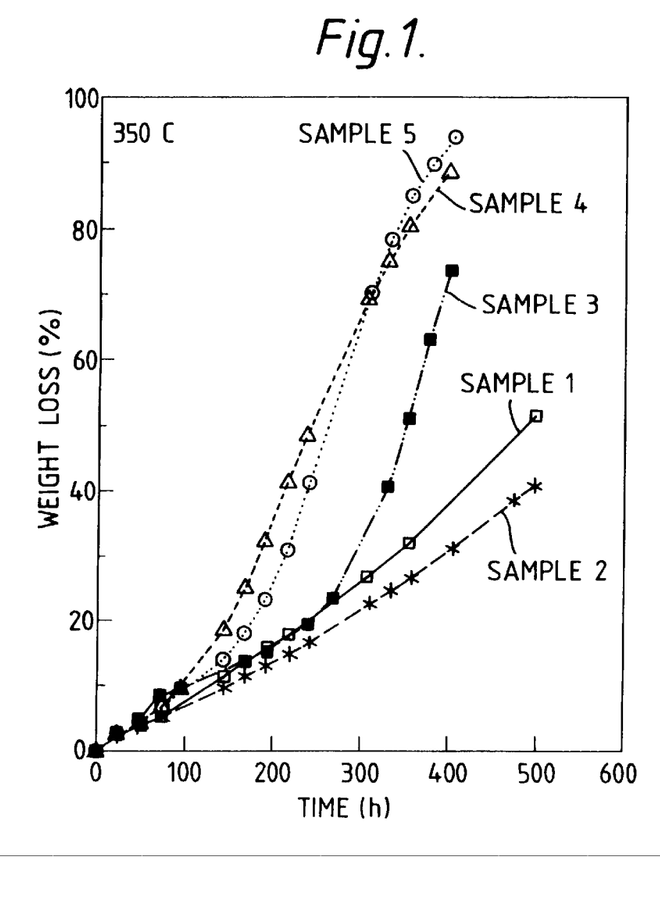
FIG. 1 is a graphical representation of weight loss data generated in the TOS evaluation of Samples 1 to 5 in Example 1.

Curable compositions based on MDA, NE and selected esters were prepared to evaluate the ester component (excluding fluorine-containing esters) of the composition with respect to TOS. The compositions were formulated to give a FMW=1500. The esters used, together with their Tg data, are given in Table 1 below. The compositions were converted into moulding powders which were moulded into plaques. The plaques were post cured at 350° C. Samples of the moulded compositions were then subjected to TOS evaluation at 350° C. The weight loss data generated were plotted, see FIG. 1, from which it is apparent that Samples 1 (PMR-15 control) and 2 contain the most stable esters.

TABLE 1

| SAMPLE NO | ESTER | Tg (° C.) |
|---|---|---|
| 1 | BTDE (PMR-15 control) | 332 |
| 2 | BPDE | 350 |
| 3 | PMDE | 370 |

TABLE 1-continued

| SAMPLE NO | ESTER | Tg (° C.) |
|---|---|---|
| 4 | DSDE | — |
| 5 | OPDE | 280 |

The processibilities of the samples were also assessed. Sample 1 (PMR-15 control) had a minimum $\eta^*$ of approximately 70 Pa.s. Samples 4 and 5 had comparable processibility to Sample 1 but Samples 2 and 3 did not flow under the rheological conditions used.

EXAMPLE 2

Curable compositions based on BTDE, NE and, as diamines, p-PDA and m-PDA and mixtures thereof were prepared to evaluate the diamine component of the composition with respect to TOS. The compositions were formulated to give a FMW=1500. A PMR-15 control (Sample 1) was also prepared. The compositions were converted into moulding powders which were moulded into plaques. Compositions containing 100% p-PDA proved to be unmouldable. The plaques were post cured at 350° C. Samples of the moulded compositions were then subjected to TOS evaluation at 350° C. for approximately 500 hours and Tg determination. The samples tested, their TOS 500 hour data and Tg data are given in Table 2 below.

The processibilities of the samples were also assessed. Only Samples 13 to 15 flowed sufficiently under the rheological conditions used to enable $\eta^*$ to be assessed. Sample 15 had a minimum $\eta^*$ of approximately 850 Pa.s; and Samples 13 and 14 had a minimum $\eta^*$ of approximately 5700 Pa.s.

TABLE 2

| SAMPLE NO | p-PDA:mPDA | WEIGHT LOSS (%) | Tg (° C.) |
|---|---|---|---|
| 1 | — | 51.4 | 332 |
| 6 | 95:5 | 47.2 | — |
| 7 | 90:10 | 35.1 | — |
| 8 | 85:15 | 32.1 | >350 |
| 9 | 80:20 | 22.5 | — |
| 10 | 70:30 | 21.1 | 381 |
| 11 | 50:50 | 14.8*[1] | 362 |
| 12 | 40:60 | 14.9 | 350 |
| 13 | 30:70 | 30 | 352 |
| 14 | 20:80 | 18.5 | 337 |
| 15 | 0:100 | 36.9 | 346 |

*[1]Estimated value at 500 hours from weight loss v time plot extending up to 575 hours.

EXAMPLE 3

Curable compositions based on a PMR-II composition, ie HFDE, NE and p-PDA and such compositions in which a part of the p-PDA is replaced by m-PDA were prepared to evaluate the TOS of the cured compositions. The compositions were formulated to give a FMW=3000. The compositions were converted into moulding powders which were moulded into plaques. The plaques were post cured at 350° C. The PMR-II formulation shows only a small weight loss when subjected to isothermal aging at 316° C. and 350° C. but a more significant weight loss at 371° C. Accordingly, samples of the moulded compositions were subjected to TOS evaluation at 371° C. for approximately 500 hours. The Tg of the samples was also determined. The samples tested, their TOS 500 hour data and Tg data, including for comparison Sample 1 data (ie PMR-15) are given in Table 3 below.

The processibilities of the samples were also assessed. Sample 16, ie PMR-II-30, had a minimum $\eta^*$ of approximately 2200 Pa.s (cf PMR-15 minimum $\eta^*$ of 70 Pa.s; Sample 17 had a minimum $\eta^*$ of approximately 240 Pa.s; and Sample 18 had a minimum $\eta^*$ 220 Pa.s.

EXAMPLE 4

Figure 2:
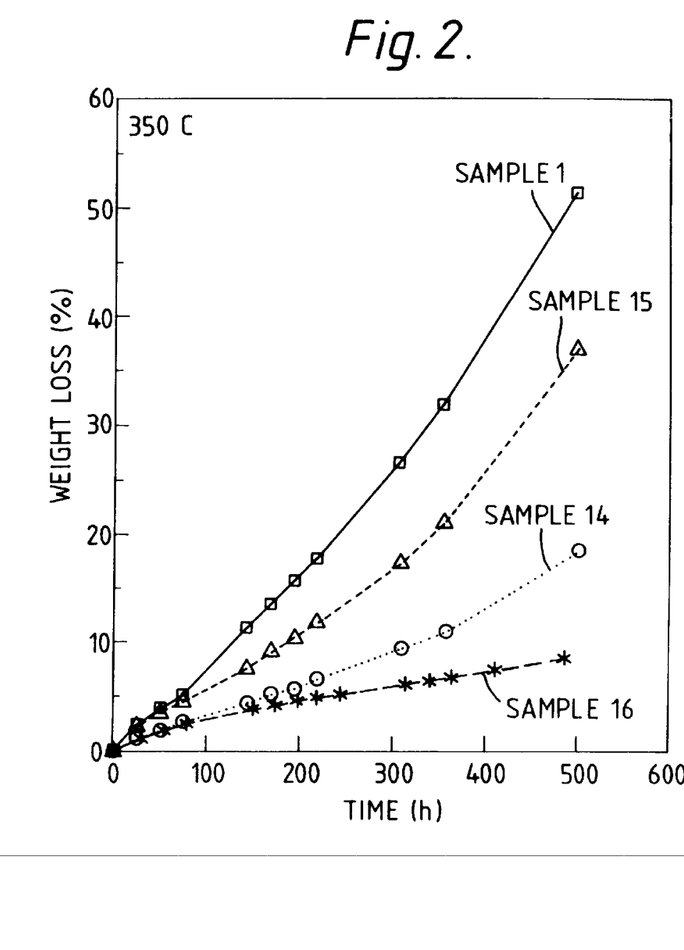
FIG. 2 is a graphical representation of weight loss data generated in the TOS evaluation of Samples 1 and 14 to 16 as described in Example 4.

The TOS weight loss data at 350° C. for approximately 500 hours for Samples 1 (PMR-15), 14 (BTDE/NE/p-PDA:m-PDA 20:80), 15 (BTDE/NE/ p-PDA:m-PDA 0:100) and 16 (PMR-II-30) are plotted in FIG. 2. As can be seen, the TOS of Sample 14 is approaching that of Sample 16.

TABLE 3

| SAMPLE NO | p-PDA:mPDA | WEIGHT LOSS (%) AT 371° C. | Tg (° C.) |
|---|---|---|---|
| 1 | — | 100*2 | 332 |
| 16 | 100:0 | 36.2 | 342 |
| 17 | 80:20 | 26 | 328 |
| 18 | 60:40 | 44.8 | — |
| 19 | 40:60 | 51.6 | — |

*2PMR-15 is almost completely decomposed after approximately 300 hours at 371° C.

EXAMPLE 5

Curable compositions were formulated to determine the effect of replacing NE with PAS in PMR-II compositions and the effect of FMW on such compositions and on compositions based Sample 15 above in TOS evaluations of the cured compositions: The compositions were converted into moulding powders which were moulded into plaques. The plaques were post cured at 350° C. The samples tested, together with Samples 1, 15 and 16, TOS 500 hour/350° C. data and TOS 600 hour/371° C. data are given in Table 4 below.

EXAMPLE 6

Curable compositions of p-PDA and PAS together with HFDE (Sample 21A) and mixtures of HFDE and BTDE, with a formulated FMW of 3000, were formulated to evaluate TOS of the cured compositions. The compositions were converted into moulding powders which were moulded into plaques. The plaques were post cured at 371° C. The samples tested, Tg, TOS 500 hour/350° C. data and TOS 500 hour/371° C. data are given in Table 5 below. The samples did not melt and flow under the rheological test conditions.

EXAMPLE 7

Curable compositions of HFDE and PAS together with p-PDA (Sample 21A) and mixtures of P-PDA and m-PDA, with a formulated FMW of 3000, were formulated to evaluate TOS of the cured compositions. The compositions were converted into moulding powders which were moulded into plaques. The plaques were post cured at 371° C. The samples tested, Tg, TOS 500 hour/350° C. data and TOS 500 hour/371° C. data are given in Table 6 below.

The samples did not melt and flow under the rheological test conditions but excellent melt flow was observed during compression moulding of the samples.

EXAMPLE 8

Curable compositions based on Sample 14, ie BTDE/NE/p-PDA:m-PDA 20:80, were formulated, FMW of 1500, together with a viscosity modifier. The compositions were converted into moulding powders which were moulded into plaques. The plaques were post cured at 350° C. The samples tested, together with Samples 1 and 14, TOS 500 hour/350° C. data and $\eta^*$ (minimum) data are given in Table 7 below.

TABLE 4

| SAMPLE NO | MONOMERS | FMW | WEIGHT LOSS (%) AT 350° C. | WEIGHT LOSS (%) AT 371° C. |
|---|---|---|---|---|
| 1 | BTDE/MDA/NE | 1500 | 52 | 100 |
| 15 | BTDE/m-PDA/NE | 1500 | 37 | — |
| 20 | HFDE/p-PDA/NE | 1500 | 22 | 64 |
| 21 | HFDE/p-PDA/PAS | 1500 | 21.5 | 54 |
| 15A | BTDE/m-PDA/NE | 3000 | 20.5 | — |
| 16 | HFDE/p-PDA/NE | 3000 | 10 | — |
| 21A | HFDE/p-PDA/PAS | 3000 | 6.0 to 9.27*4 | — |

*3At approximately 300 hours.
*4Several samples gave values within this range.

TABLE 5

| SAMPLE NO | HFDE:BTDE RATIO | WEIGHT LOSS (%) AT 350° C. | WEIGHT LOSS (%) AT 371° C. | Tg (° C.) |
|---|---|---|---|---|
| 21A | 100:0 | 6.0 to 9.27*4 | 20.69 | 316 |
| 22 | 80:20 | 0.58 | 25.48 | 320 |
| 23 | 60:40 | 10.6 | 34.58 | 332 |
| 24 | 40:60 | 8.01 | 24.41 | 410*5 |
| 25 | 20:80 | 7.14 | 24.35 | 402*5 |

*4Several samples gave values within this range.
*5Not a sharp break in E'.

TABLE 6

| SAMPLE NO | p-PDA:m-PDA RATIO | WEIGHT LOSS (%) AT 350° C. | WEIGHT LOSS (%) AT 371° C. | Tg (° C.) |
|---|---|---|---|---|
| 21A | 100:0 | 9.27 | 20.69 | 316 |
| 26 | 90:10 | 8.72 | 19.32 | 333 |
| 27 | 80:20 | 9.42 | 21.13 | 344 |
| 28 | 70:30 | 9.07 | 22.27 | 363 |
| 29 | 50:50 | 7.54 | 19.64 | 359 |
| 30 | 0:100 | 9.02 | 18.07 | 339 |

TABLE 7

| SAMPLE NO | MODIFIER | % w/w MODIFIER | $\eta^*$ (Pa · s) | WEIGHT LOSS (%) |
|---|---|---|---|---|
| 1 | — | — | 70 | 51.4 |
| 14 | — | — | 5700 | 18.5 |
| 31 | NPN | 2 | 143 | 20.9 |
| 32 | NPN | 4 | 170 | 20.5 |
| 33 | NPN | 6 | 82 | 24 |
| 34 | NPN | 10 | 49 | — |
| 35 | F-NPN | 2 | 309 | 23.4 |
| 36 | MDA-BISNADIMIDE | 2 | 370 | 19.8 |
| 37 | MDA-BISNADIMIDE | 4 | 200 | 17 |
| 38 | MDA-BISNADIMIDE | 6 | 200 | 24 |

TABLE 7-continued

| SAMPLE NO | MODIFIER | % w/w MODIFIER | η* (Pa · s) | WEIGHT LOSS (%) |
|---|---|---|---|---|
| 39 | MDA-BISNADIMIDE | 10 | 140 | — |
| 40 | m-PDA-BISNADIMIDE | 2 | 287 | 22.3 |

EXAMPLE 9

Selected fibres (12k tows) were impregnated with a number of curable compositions using conventional PMR prepregging techniques, ie monomers in methanol, to form prepregs. The curable compositions were of alkyl diester/ diamine/end cap in the molar ratios n:n+1:2 together with a viscosity modifier present in a weight % based on the weight of the alkyl diester/diamine/end cap. All of the compositions used a mixture of p-PDA and m-PDA as the diamine, NE as the end cap and NPN as the viscosity modifier. A PMR-15 control composition, Sample 41, was also used. Further details of the fibres and the compositions are given in Table 8 below.

Figure 3A:
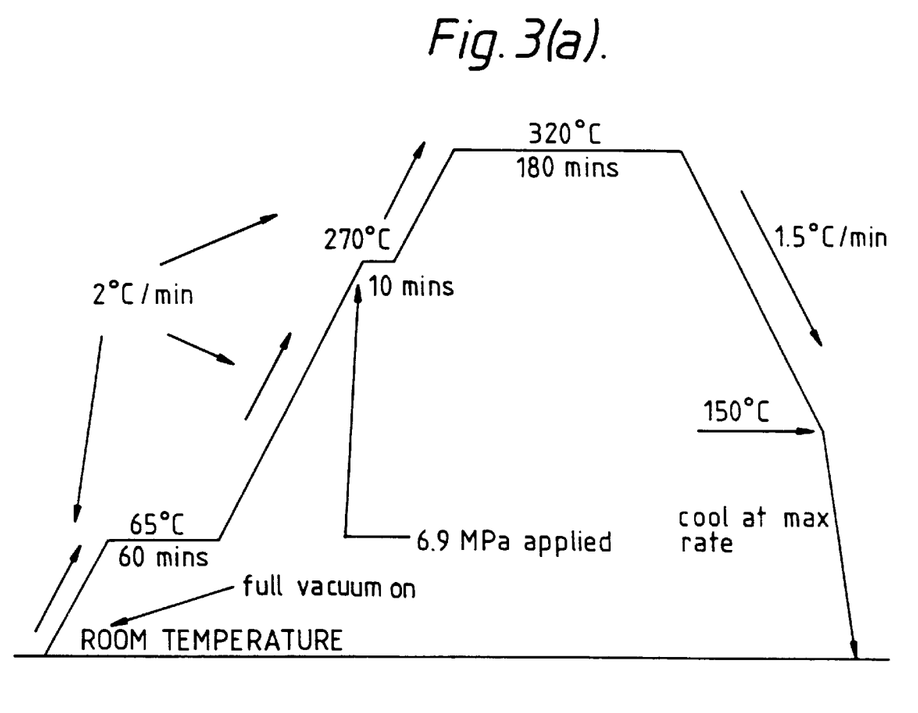
FIGS. 3(a) and 3(b) are respectively the imidization/cure cycle and post cure cycle used to make the laminates of Example 9.
Figure 3B:
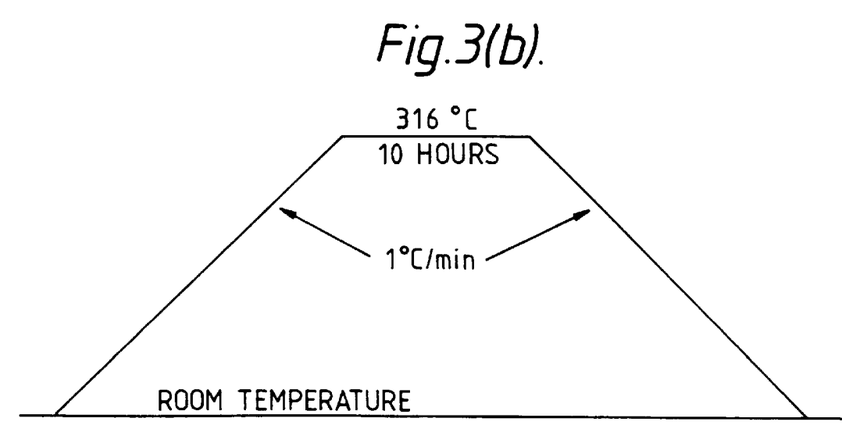

Each prepreg had a resin content of 35±5 wt %. Each prepreg sample was then laid up as $[0]_{24}$ 150 mm×100 mm laminates in a matched metal mould and imidised and cured using a compression moulding cycle shown in FIG. 3(a). The resultant consolidated laminates were post cured at ambient pressure in an air circulating oven using the cycle shown in FIG. 3(b). The resultant laminates were isothermally aged (average of 5 samples), and tested to determine $G_{1c}$ and short beam shear strength (SBSS), the results of which are also given in Table 8.-

Ultrasonic C-scan examination of the consolidated laminates demonstrated the laminates had a very low void content.

EXAMPLE 10

Curable compositions based on various selected esters and mixtures thereof together with NE, p-PDA/m-PDA mixtures and 2% w/w of NPN were formulated (various FMW). The compositions were converted into moulding powders and moulded into plaques. The plaques were posted cured at 350° C. for 10 hours. The samples tested, TOS data at 316° C. and 350° C. (approximately 500 hours) and η* minimum data are given in Table 9 below.

TABLE 8

| SAMPLE NO | DIESTER | MONOMERS p-PDA:m-PDA RATIO | MODIFIER WT % | FMW | % WT LOSS AT 316° C. | % WT LOSS AT 350° C. | $G_{1c}$ (KJ/m²) INITIATION | PROPAGATION | SBSS (MPa) |
|---|---|---|---|---|---|---|---|---|---|
| 41 | — | PMR-15 CONTROL | — | 1500 | 2.6 | 26.1 | 0.23 | 0.26 | 94.5 (2.8) |
| 42 | BTDE | 20:80 | 2 | 1300 | 2.6 | 18.3 | 0.2 | 0.5 | 84.5 (12.2) |
| 43 | BTDE | 20:80 | 2 | 1500 | 1.6 | 13.5 | — | — | — |
| 44 | BTDE | 20:80 | 2 | 1500 | 1.6 | 15.1 | 0.17 | 0.53 | 80.3 (4.1) |
| 45 | BTDE | 20:80 | 1.1 | 1500 | 2.9 | 12.8 | — | — | — |
| 46 | BTDE | 20:80 | 3 | 1800 | 2 | 17.5 | 0.32 | 0.67 | 90 (4.1) |
| 47 | BTDE | 30:70 | 2 | 1300 | 2.5 | 20.8 | 0.3 | 0.87 | 94.8 (6.2) |
| 48 | BTDE | 30:70 | 4 | 1500 | — | — | 0.17 | 0.6 | 94.8 (11.1) |
| 49 | BTDE/HFDE 70:30 | 20:80 | 4 | 2000 | — | 12.6 | — | — | — |

Note 1 With the exception of Sample 43 which used AS4 fibres from Hercules, all of the other samples used G30-500 fibres available under the trade name Celion.
Note 2 The SBSS results show the standard deviations in brackets.

TABLE 9

| SAMPLE NO | DI-ESTERS | MONOMERS p-PDA:m-PDA | FMW | % WT LOSS AT 316° C.*[7] | % WT LOSS AT 350° C.*[7] | η |
|---|---|---|---|---|---|---|
| 50 | BTDE | 20:80 | 1500 | 4.2 | 19.7 | 234 |
| 51 | DSDE | 20:80 | 1500 | 10.5 | 84.6 | 73 |
| 52 | ODPE | 20:80 | 1500 | 4.1 | 26.7 | 156 |
| 53 | PMDE | 20:80 | 1500 | 40.6 | 90.2 | —*[6] |
| 54 | BPDE | 20:80 | 1500 | 15.6 | 35.1 | —*[6] |
| 55 | HFDE | 20:80 | 1500 | 5.4 | 13.1 | 16 |
| 56 | HFDE | 20:80 | 2000 | 4.4 | 12 | 560 |
| 57 | HFDE | 50:50 | 2000 | 3.7 | 8.9 | 1070 |
| 58 | HFDE/ BPDE 30:70 | 20:80 | 1500 | 3.9 | 12.7 | 63 |
| 59 | HFDE/ BPDE 70:30 | 20:80 | 1500 | 4.5 | 13.7 | 38 |

*[6]Samples did not melt and flow under the rheological test conditions.

We claim:

1. A curable composition comprising:
   a) at least one aromatic tetracarboxylic acid, its dianhydride or alkyl diester;
   b) a mixture of p-phenylenediamine and m-phenylenediamine wherein the molar ratio of p-phenylenediamine to m-phenylenediamine is from about 1:99 to 95:5;

c) Compounds of formula:

wherein $R^2$ are alkyl or hydrogen and at least one $R^2$ is alkyl and $R^4$ is a divalent radical of the formula:

wherein $R^5$ is hydrogen or lower alkyl; and d) a viscosity modifier, wherein the molar ratio of a:b:c is n:(n+1):2, wherein n has a value from 1 to 20 and wherein at least a portion of c) is replaced by:

e) a substituted aromatic component having at least two substituents wherein at least one substituent is selected from the group consisting of an amine, acid, ester and anhydride and at least one substituent is a vinyl or ethynyl substituent;

wherein, when said component e) is an amine, the molar ratio of a:b is adjusted to provide sufficient component a) to react with component e).

2. A curable composition according to claim 1 in which component a) of said composition is at least one aromatic tetracarboxylic acid, its dianhydride or alkyl diester selected from the group consisting of 3,3',4,4'-benzophenonetetracarboxylic acid, 4,4'-(hexafluoroisopropylidene)bis(phthalic acid) and 2,2',3,3'-diphenyltetracarboxylic acid, their dianhydrides or alkyl.

3. A curable composition according to claim 2 in which component a) of said composition is a dialkyl ester of at least one aromatic tetracarboxylic acid.

4. A curable composition according to claim 1 in which, component c) of said composition is a mono alkyl ester of 5-norbornene-2,3-di-carboxylic acid.

5. A curable composition according to claim 1 in which said composition comprises:

a) at least one $C_1$ to $C_4$ alkyl diester of an aromatic tetracarboxylic acid selected from the group consisting of 3,3',4,4'-benzophenonetetracarboxylic acid and 4,4'-(hexafluoroisopropylidene)bis(phthalic acid) and, optionally, a minor proportion of 2,2',3,3-diphenyltetracarboxylic acid;

b) a mixture of p-phenylenediamine and m-phenylenediamine wherein the molar ratio of p-phenylenediamine to m-phenylenediamine is from about 1:99 to 95:5; and c) a mono alkyl ester of 5-norbornene-2,3-dicarboxylic acid; and d) a viscosity modifier;

wherein the molar ratio of a:b:c is n:(n+1):2, wherein n has a value from 1 to 20 and wherein at least a portion of c) is replaced by:

e) a substituted aromatic amine having a vinyl or ethynyl substituent;

wherein the molar ratio of a:b is adjusted to provide sufficient component a) to react with component e).

6. A curable composition according to claim 5 in which the molar ratio of p-phenylenediamine to m-phenylene diamine is in the range 5:95 to 60:40.

7. A curable composition according to claim 5 in which the molar ratio of p-phenylenediamine to m-phenylene diamine is in the range 10:90 to 55:45.

8. A curable composition according to claim 5 in which the molar ratio of p-phenylenediamine to m-phenylene diamine is substantially 20:80.

9. A curable composition according to claim 1 in which said composition comprises:

a) at least 10 mole % of a $C_1$ to $C_4$ alkyl diester of 4,4'-(hexafluoroisopropylidene)bis(phthalic acid) and, optionally, at least one $C_1$ to $C_4$ alkyl diester of an aromatic tetracarboxylic acid selected from the group consisting of 3,3',4,4'-benzophenonetetracarboxylic acid and 2,2',3,3'-diphenyltetracarboxylic acid;

b) a mixture of p-phenylenediamine and m-phenylenediamine in the molar ratios 95:5 to 70:30; and c) a mono alkyl ester of 5-norbornene-2,3-dicarboxylic acid; and d) a viscosity modifier;

wherein the molar ratio of a:b:c is n:(n+1):2, wherein n has a value from 1 to 20 and wherein at least a portion of c) is replaced by:

e) a substituted aromatic amine having a vinyl or ethynyl substituent;

wherein the molar ratio of a:b is adjusted to provide sufficient component a) to react with component e).

10. A curable composition according to claim 9 in which the molar ratio of p-phenylenediamine to m-phenylene diamine is in the range 90:10 to 75:25.

11. A curable composition according to claim 9 in which the molar ratio of p-phenylenediamine to m-phenylenediamine is in the range 85:15 to 75:25.

12. A curable composition according to claim 9 in which the molar ratio of p-phenylenediamine to m-phenylene diamine is substantially 80:20.

13. A curable composition according to claim 1 in which said alkyl diesters of said acids are methyl diesters.

14. A curable composition according to claim 1 wherein n has a value from 1 to 10.

15. A curable composition according to claim 1 wherein n has a value from 1.5 to 6.5.

16. A curable composition according to claim 1 in which component c) of said composition is the mono methyl ester of 5-norbornene-2,3-di-carboxylic acid.

17. A curable composition according to claim 1 in which component d) of the curable composition is selected from the group consisting of mono- or bis-nadimides derived respectively from mono, unsubstituted or halo- substituted, amines and unsubstituted diamines of formula $H_2N-Ph-(X-Ph)_2-NH_2$ wherein Ph is 1,3-phenylene or 1,4-phenylene, X is a direct bond, $-CO-$, $-SO-$, $-SO_2-$, $-O-$, $-CR^6_2$, wherein $R^6$ is $-H$, $-CH_3$ or $-CF_3$ and a is an integer from 0 to 5, preferably from 0 to 2 and especially is 0 or 1.

18. A curable composition according to claim 1 in which component d) of said composition is at least one compound of formula:

wherein $R^7$ is selected from the group consisting of bis(1, 4-phenylene)methane and 1,3-phenylene and $R^6$ is selected from the group consisting of phenyl and 4-fluorophenyl.

19. A curable composition according to claim 1 in which component d) is present in said composition in an amount not more than 10% by weight based on the weight of components a), b) and c).

20. A curable composition according to claim 1 in which component d) is present in said composition in an amount not more than 5% by weight based on the weight of components a), b) and c).

21. A curable composition according to claim 1 in which component d) is present in said composition in an amount not more than 2%, by weight based on the weight of components a), b) and c).

22. A curable composition according to claim 1 in which component d) is present in said composition in an amount not less than 1% by weight based on the weight of components a), b) and c).

23. A curable composition according to claim 1 in which component e) of said composition is selected from the group consisting of 3-aminostyrene, 4-aminostyrene, 3-ethynylaniline, 4-ethynylaniline, and 3- or 4-allyl-substituted or ethynyl-substituted phthalic mono-alkyl ester or anhydride.

24. A curable composition according to claim 23 in which said mono-alkyl ester is methyl ester.

25. A curable composition according to claim 23 in which component e) is 4-aminostyrene.

26. A curable composition according to claim 1 in which said composition has a FMW between 1200 and 6000.

27. A curable composition according to claim 1 in which said composition has a FMW between 1200 and 3500.

28. A curable composition according to claim 1 in which said composition further comprises fibre reinforcement.

29. Composite materials comprising plies of fibre-reinforced curable compositions, said curable compositions being as defined in claim 1, laminated together by heat and pressure at a temperature above the curing temperature of said curable composition.

* * * * *